(12) United States Patent
Kawakami et al.

(10) Patent No.: US 9,612,041 B2
(45) Date of Patent: Apr. 4, 2017

(54) HYBRID VEHICLE BATTERY CHARGING COOLING APPARATUS

(75) Inventors: Yoshiaki Kawakami, Nagoya (JP); Yuki Jojima, Nagoya (JP); Eizo Takahashi, Chiryu (JP); Kousuke Sato, Toyota (JP); Kazuhide Uchida, Hamamatsu (JP); Yuichi Ohno, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 14/111,420

(22) PCT Filed: Apr. 17, 2012

(86) PCT No.: PCT/IB2012/000762
§ 371 (c)(1),
(2), (4) Date: Oct. 11, 2013

(87) PCT Pub. No.: WO2012/143778
PCT Pub. Date: Oct. 26, 2012

(65) Prior Publication Data
US 2014/0033761 A1    Feb. 6, 2014

(30) Foreign Application Priority Data

Apr. 18, 2011  (JP) .................. 2011-091750

(51) Int. Cl.
*F25B 1/00*   (2006.01)
*F25B 13/00*  (2006.01)
(Continued)

(52) U.S. Cl.
CPC ........... *F25B 1/00* (2013.01); *B60H 1/00278* (2013.01); *B60H 1/00907* (2013.01);
(Continued)

(58) Field of Classification Search
CPC ............ B60H 1/00907; B60H 1/00278; B60H 2001/00307; B60H 2001/00949;
(Continued)

(56) References Cited

U.S. PATENT DOCUMENTS 5,291,941 A * 3/1994 Enomoto ........... B60H 1/00007
165/43
5,606,239 A * 2/1997 Schumann ............... B60K 1/04
336/55
(Continued)

FOREIGN PATENT DOCUMENTS

FR   WO 2010092282 A1 *  8/2010  ......... B60H 1/00907
JP   A-04-275492         10/1992
(Continued)

OTHER PUBLICATIONS

Partial Translation of Sep. 26, 2014 Office Action issued in Japanese Application No. 2011-091750.

*Primary Examiner* — Etsub Berhanu
*Assistant Examiner* — Jose O Class-Quinones
(74) *Attorney, Agent, or Firm* — Oliff PLC

(57) ABSTRACT

Exemplary embodiments of a cooling apparatus cool a charger for charging a storage battery upon reception of a supply of power from a power supply. Exemplary embodiments include a compressor that circulates a refrigerant, a cooling unit provided on a path along which the refrigerant flows between the heat exchanger and the expansion valve to cool the charger using the refrigerant, a refrigerant passage through which the refrigerant flows between the compressor and the heat exchanger, a refrigerant passage through which the refrigerant flows between the cooling unit and the expansion valve, and a connecting passage connecting the refrigerant passage and the refrigerant passage. When heating occurs, frost formation can be suppressed (Continued)

without increasing configuration complexity and power consumption.

8 Claims, 3 Drawing Sheets

(51) Int. Cl.
*F25B 47/02* (2006.01)
*B60H 1/00* (2006.01)

(52) U.S. Cl.
CPC ............ *F25B 13/00* (2013.01); *F25B 47/025* (2013.01); *B60H 1/00878* (2013.01); *B60H 2001/003* (2013.01); *B60H 2001/00307* (2013.01); *B60H 2001/00935* (2013.01); *B60H 2001/00949* (2013.01); *F25B 2313/0254* (2013.01); *F25B 2313/02741* (2013.01); *F25B 2400/0401* (2013.01); *F25B 2400/0409* (2013.01); *F25B 2400/0411* (2013.01)

(58) Field of Classification Search
CPC .... B60H 2001/00935; B60H 2001/003; B60H 1/00878; B60H 1/00885; F25B 2313/0254; F25B 2400/0409; F25B 2400/0411; F25B 2400/0401; F25B 6/04
See application file for complete search history.

(56) References Cited

U.S. PATENT DOCUMENTS

| | | | | |
|---|---|---|---|---|
| 5,689,962 A * | 11/1997 | Rafalovich | ............. | F24F 3/153 62/324.1 |
| 5,701,753 A * | 12/1997 | Iritani | ................. | B60H 1/3205 62/211 |
| 6,059,027 A * | 5/2000 | Lake | ................... | B60H 1/00907 165/204 |
| 2001/0040061 A1* | 11/2001 | Matuda | .............. | B60H 1/00278 180/68.2 |
| 2004/0194489 A1* | 10/2004 | Pode | ................... | B60H 1/00278 62/259.2 |
| 2004/0194949 A1* | 10/2004 | Ban | .................... | B60H 1/00314 165/287 |
| 2005/0218135 A1* | 10/2005 | Kraemer | ............ | B60H 1/00364 219/202 |
| 2005/0229629 A1* | 10/2005 | Burk | ................... | B60H 1/00878 62/498 |
| 2007/0214817 A1* | 9/2007 | Inaba | ................. | B60H 1/00885 62/238.6 |
| 2011/0108242 A1* | 5/2011 | Eichberger | ......... | B60H 1/00278 165/104.21 |
| 2011/0284181 A1* | 11/2011 | Rached | .............. | B60H 1/00907 165/51 |
| 2012/0174602 A1 | 7/2012 | Olivier et al. | | |

FOREIGN PATENT DOCUMENTS

| | | |
|---|---|---|
| JP | H04-120577 U | 10/1992 |
| JP | A-06-024235 | 2/1994 |
| JP | 2003-139431 A | 5/2003 |
| JP | A-2005-090862 | 4/2005 |
| JP | 2006-002588 A | 1/2006 |
| JP | A-2009-143509 | 7/2009 |
| JP | A-2010-081704 | 4/2010 |
| WO | 2011/015734 A1 | 2/2011 |

* cited by examiner

HYBRID VEHICLE BATTERY CHARGING COOLING APPARATUS

BACKGROUND OF THE INVENTION

1. Field of the Invention

The invention relates to a cooling apparatus, and more particularly to a cooling apparatus that cools a charger for charging a storage battery using a vapor compression refrigeration cycle.

2. Description of Related Art

In recent years, hybrid vehicles (HVs), fuel cell vehicles, electric automobiles, and so on which travel using driving force from a motor have come to attention as a countermeasure to environmental problems. In this type of vehicle, electric devices such as the motor, a generator, an inverter, a converter, and a battery generate heat during power transfer. It is therefore necessary to cool these electric devices. Hence, techniques in which a heat generating body is cooled using a vapor compression refrigeration cycle employed as a vehicle air-conditioning apparatus have been proposed.

For example, Japanese Patent Application Publication No. 2005-90862 (JP 2005-90862 A) discloses a cooling system in which heat generating body cooling means for cooling a heat generating body is provided in a bypass passage that bypasses a pressure reducer, an evaporator, and a compressor of an air-conditioning refrigeration cycle.

Incidentally, when a heating operation is performed using a vapor compression refrigeration cycle, a heat exchange capacity deteriorates due to frost formation on an external heat exchanger. In response to this problem, Japanese Patent Application Publication No. 6-24235 (JP 6-24235 A) proposes a technique for preventing frost formation on an external heat exchanger by combining air-conditioning using a heat storage system with air-conditioning using a vapor compression refrigeration cycle such that during a heating operation, warm air generated by an external heat exchanger is supplied to an external heat exchanger of the vapor compression refrigeration cycle.

Meanwhile, various techniques for cooling a charger installed in a vehicle have been proposed in the related art. For example, Japanese Patent Application Publication No. 2010-81704 (JP 2010-81704 A) discloses a technique in which a circulation passage is formed to connect a charger to a radiator and circulate cooling water therebetween, heat is discharged effectively from the cooling water flowing through the radiator by driving a cooling fan to transmit air to the radiator, the cooling water heat-discharged by the radiator is caused to flow to the charger by driving a pump, and heat exchange is performed between the charger and the cooling water such that the charger is cooled.

Japanese Patent Application Publication No. 4-275492 (JP 4-275492 A) discloses a cooling apparatus in which a charger that charges a battery by rectifying power from a power supply is provided in an electric automobile, a pipe forming a coolant circulation path is laid so as to pass through the charger, and the coolant is circulated through the coolant circulation path using a coolant pump.

Japanese Patent Application Publication No. 2009-143509 (JP 2009-143509 A) discloses a technique in which a battery that generates heat during charging is disposed such that heat exchange occurs between the battery and cooling air, whereby an amount of heat generated during charging is radiated to the cooling air so as to cool the battery. JP 2009-143509 A also discloses a technique in which warm air warmed by waste heat from the battery passes through a heat exchanger provided in a heat pump for use during an evaporation process such that an amount of heat included in the warm air is recovered as a heat source for the evaporation process of a heat cycle.

When an air-conditioning apparatus employing a vapor compression refrigeration cycle is used during cold weather or in a cold location, a problem occurs in that frost forms on the external heat exchanger during the heating operation. When frost forms on the external heat exchanger, heat exchange between a refrigerant and atmospheric air is impaired, and therefore a defrosting operation is performed by forcibly implementing a cooling operation in order to remove the frost. During the defrosting operation, a compressor must be activated even though the heating operation is not required, and therefore a power consumption of the compressor increases. JP 6-24235 A discloses a technique for avoiding the defrosting operation by preventing frost from forming on the external heat exchanger, but in this case, a system is required to supply warm air to the external heat exchanger, and therefore an apparatus configuration becomes complicated and an increase in power consumption occurs due to the need to operate the pump.

SUMMARY OF THE INVENTION

The invention has been designed in consideration of the problems described above, and provides a cooling apparatus that cools a charger for charging a storage battery using a vapor compression refrigeration cycle, in which frost formation on a heat exchanger can be suppressed without increases in configuration complexity and power consumption.

For this purpose, an aspect of the invention provides a cooling apparatus that cools a charger for charging a storage battery upon reception of a supply of power from a power supply, including: a compressor that circulates a refrigerant; a first heat exchanger and a second heat exchanger that perform heat exchange between the refrigerant and outside air; a pressure reducer that reduces a pressure of the refrigerant; a third heat exchanger that performs heat exchange between the refrigerant and air-conditioning air; a cooling unit provided on a path along which the refrigerant flows between the second heat exchanger and the pressure reducer in order to cool the charger using the refrigerant; a first passage through which the refrigerant flows between the compressor and the first heat exchanger; a second passage through which the refrigerant flows between the cooling unit and the pressure reducer; and a connecting passage that connects the first passage and the second passage.

The cooling apparatus described above may further include a switch valve that switches a communication condition between the first passage and the connecting passage.

The cooling apparatus described above may further include another cooling unit provided on a path along which the refrigerant flows between the first heat exchanger and the second heat exchanger in order to cool a heat generation source using the refrigerant. The cooling apparatus may further include a third passage and a fourth passage connected in parallel between the first heat exchanger and the second heat exchanger, wherein the other cooling unit is provided in the fourth passage. The cooling apparatus may further include a refrigerant shutoff valve that shuts off a flow of the refrigerant through the fourth passage.

The cooling apparatus described above may further include a flow control valve that adjusts a flow rate of the refrigerant flowing through the third passage. The cooling apparatus may further include a four-way valve that switches between a refrigerant flow from the compressor to the first heat exchanger and a refrigerant flow from the compressor to the third heat exchanger. Furthermore, in the cooling apparatus described above, the switch valve may be a three-way valve disposed midway on the first passage in order to switch respective communication conditions of three passages, namely a passage between the switch valve and the four-way valve in the first passage, a passage between the switch valve and the first heat exchanger in the first passage, and the connecting passage.

With the cooling apparatus according to the invention described above, frost formation on the heat exchanger can be suppressed without increases in configuration complexity and power consumption.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
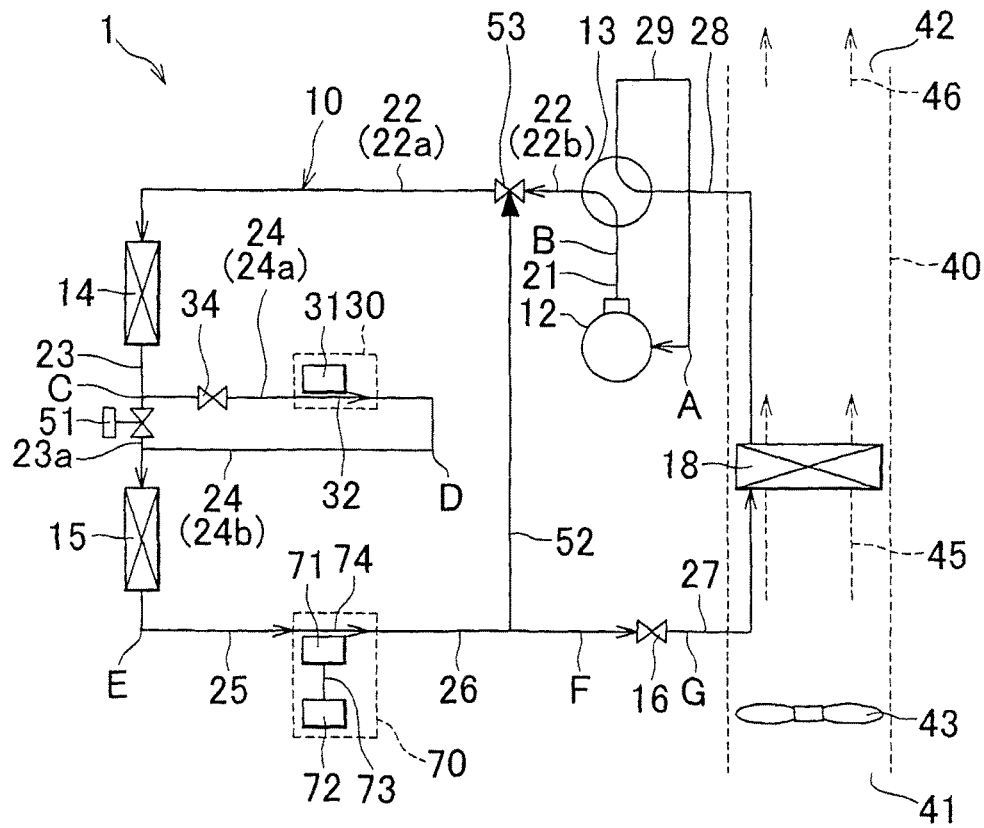
FIG. 1 is a schematic diagram showing a configuration of a cooling apparatus according to an embodiment of the invention, and showing a flow of a refrigerant during a cooling operation.

Embodiments of the invention will be described below on the basis of the drawings. Note that in the following drawings, identical or corresponding parts have been allocated identical reference numerals, and description thereof has not been repeated.

FIG. 1 is a schematic diagram showing a configuration of a cooling apparatus according to an embodiment. As shown in FIG. 1, a cooling apparatus 1 includes a vapor compression refrigeration cycle 10. The vapor compression refrigeration cycle 10 is installed in a vehicle in order to cool and heat a vehicle interior of the vehicle, for example. Cooling is performed using the vapor compression refrigeration cycle 10 when, for example, a switch for performing cooling is switched ON or an automatic control mode for adjusting a temperature in a passenger compartment of the vehicle to a set temperature automatically has been selected and the temperature in the passenger compartment is higher than the set temperature. Heating is performed using the vapor compression refrigeration cycle 10 when, for example, a switch for performing heating is switched ON or the automatic control mode has been selected and the temperature in the passenger compartment is lower than the set temperature.

The vapor compression refrigeration cycle 10 includes a compressor 12, a heat exchanger 14 serving as a first heat exchanger, a heat exchanger 15 serving as a second exchanger, an expansion valve 16 serving as an example of a pressure reducer, and a heat exchanger 18 serving as a third heat exchanger. The vapor compression refrigeration cycle 10 also includes a four-way valve 13. The four-way valve 13 is disposed to be capable of switching between a refrigerant flow traveling from the compressor 12 toward the heat exchanger 14 and a refrigerant flow traveling from the compressor 12 toward the heat exchanger 18.

The compressor 12 is operated using a motor or an engine installed in the vehicle as a power source to compress refrigerant gas adiabatically into superheated refrigerant gas. The compressor 12 aspirates and compresses a gas phase refrigerant that flows when the vapor compression refrigeration cycle 10 is operative, and discharges a high-temperature, high-pressure gas phase refrigerant. By discharging the refrigerant, the compressor 12 circulates the refrigerant through the vapor compression refrigeration cycle 10.

The heat exchangers 14, 15, 18 respectively include a tube through which the refrigerant flows and a fin that performs heat exchange between the refrigerant flowing through the tube and air on the periphery of the heat exchangers 14, 15, 18. The heat exchangers 14, 15, 18 perform heat exchange between the refrigerant and either an air flow supplied by a natural breeze generated as the vehicle travels or an air flow supplied by a fan. The heat exchangers 14, 15, 18 are connected in series such that an entire amount of the refrigerant flowing through the vapor compression refrigeration cycle 10 passes through the heat exchangers 14, 15, 18 during both a cooling operation and a heating operation.

The expansion valve 16 expands a high-pressure liquid phase refrigerant by ejecting the liquid phase refrigerant through a small hole. As a result, the high-pressure liquid phase refrigerant is changed into a low-temperature, low-pressure mist-form refrigerant. The expansion valve 16 reduces a pressure of a condensed refrigerant liquid to generate wet vapor in a gas-liquid mixed state. Note that the pressure reducer for reducing the pressure of the refrigerant liquid is not limited to the expansion valve 16 that performs throttle expansion, and may also be a capillary tube.

The vapor compression refrigeration cycle 10 further includes refrigerant passages 21 to 29. The vapor compression refrigeration cycle 10 is formed by connecting the compressor 12, the heat exchanger 14 and the heat exchanger 15, the expansion valve 16, and the heat exchanger 18 to each other using the refrigerant passages 21 to 29.

The refrigerant passage 21 connects the compressor 12 to the four-way valve 13. The refrigerant flows from the compressor 12 to the four-way valve 13 through the refrigerant passage 21. The refrigerant passage 22 connects the four-way valve 13 to the heat exchanger 14. The refrigerant flows from one of the four-way valve 13 and the heat exchanger 14 to the other through the refrigerant passage 22. The refrigerant passage 23 connects the heat exchanger 14 to the heat exchanger 15. The refrigerant flows from one of the heat exchanger 14 and the heat exchanger 15 to the other through the refrigerant passage 23.

The refrigerant passage 23 includes a passage forming portion 23a forming a part of the refrigerant passage 23. The refrigerant passage 24 is a refrigerant path provided in parallel with the passage forming portion 23a. A cooling unit 30 to be described below is provided on the refrigerant passage 24. The refrigerant flowing through the refrigerant passage 24 is supplied to the cooling unit 30 to cool a heat generation source, to be described below.

The refrigerant passage 25 connects the heat exchanger 15 to a cooling unit 70. The refrigerant flows from one of the heat exchanger 15 and the cooling unit 70 to the other through the refrigerant passage 25. The refrigerant passage 26 connects the cooling unit 70 to the expansion valve 16. The refrigerant flows from one of the cooling unit 70 and the expansion valve 16 to the other through the refrigerant passage 26.

The refrigerant passage 27 connects the expansion valve 16 to the heat exchanger 18. The refrigerant flows from one of the expansion valve 16 and the heat exchanger 18 to the other through the refrigerant passage 27. The refrigerant passage 28 connects the heat exchanger 18 to the four-way valve 13. The refrigerant flows from one of the heat exchanger 18 and the four-way valve 13 to the other through the refrigerant passage 28. The refrigerant passage 29 connects the four-way valve 13 to the compressor 12. The refrigerant flows from the four-way valve 13 to the compressor 12 through the refrigerant passage 29.

Note that carbon dioxide, a hydrocarbon such as propane or isobutane, ammonia, water, or the like, for example, may be used as the refrigerant of the vapor compression refrigeration cycle 10.

A cooling unit 70 is provided on the path along which the refrigerant flows between the heat exchanger 15 and the expansion valve 16. The cooling unit 70 includes a charger 71 and a cooling passage 74 constituted by a pipe through which the refrigerant flows. One end portion of the cooling passage 74 is connected to the refrigerant passage 25, and another end portion of the cooling passage 74 is connected to the refrigerant passage 26.

The charger 71 is electrically connected to a chargeable/dischargeable storage battery 72 via a wire 73. The charger 71 includes a power conversion switching element in order to convert power supplied from an external power supply into a predetermined charging voltage (direct current). The power subjected to power conversion by the charger 71 is supplied to the storage battery 72, and the storage battery 72 is charged thereby.

The refrigerant that flows to the cooling unit 70 so as to pass through the cooling passage 74 cools the charger 71 by drawing heat from the charger 71. The cooling unit 70 is structured such that heat exchange can be performed between the charger 71 and the refrigerant in the cooling passage 74. In this embodiment, the cooling unit 70 includes the cooling passage 74 formed such that an outer peripheral surface thereof directly contacts a casing of the charger 71, for example. The cooling passage 74 includes a part that is adjacent to the casing of the charger 71. In this part, heat exchange can be performed between the refrigerant flowing through the cooling passage 74 and the charger 71.

The charger 71 is cooled by being directly connected to the outer peripheral surface of the cooling passage 74 that forms a part of the refrigerant path between the heat exchanger 15 and the expansion valve 16 of the vapor compression refrigeration cycle 10. Since the charger 71 is disposed on an exterior of the cooling passage 74, the charger 71 does not interfere with the refrigerant flow flowing through the interior of the cooling passage 74. Accordingly, pressure loss in the vapor compression refrigeration cycle 10 does not increase, and therefore the charger 71 can be cooled without increasing a power of the compressor 12.

Alternatively, the cooling unit 70 may include an arbitrary conventional heat pipe that is interposed between the charger 71 and the cooling passage 74. In this case, the charger 71 is connected to the outer peripheral surface of the cooling passage 74 via the heat pipe and cooled by heat transferred from the charger 71 to the cooling passage 74 via the heat pipe. By setting the charger 71 as a heat pipe heating portion and setting the cooling passage 74 as a heat pipe cooling portion, a heat transfer efficiency between the cooling passage 74 and the charger 71 can be improved, leading to an improvement in an efficiency with which the charger 71 is cooled. A Wick Heating Pipe, for example, may be used.

Heat can be transferred reliably from the charger 71 to the cooling passage 74 using the heat pipe, and therefore the charger 71 and the cooling passage 74 may be distanced from each other, thereby eliminating the need to provide the cooling passage 74 in a complicated arrangement to ensure that the cooling passage 74 contacts the charger 71. As a result, a disposal freedom of the charger 71 can be improved.

The refrigerant path between the heat exchanger 14 and the heat exchanger 15 includes the passage forming portion 23a serving as a third passage and the refrigerant passage 24 serving as a fourth passage, which are connected in parallel. A cooling unit 30 is provided on the refrigerant passage 24 as another cooling unit differing from the cooling unit 70 that cools the charger 71. By providing the cooling unit 30, the refrigerant passage 24 is divided into a refrigerant passage 24a on the heat exchanger 14 side of the cooling unit 30 and a refrigerant passage 24b on the heat exchanger 15 side of the cooling unit 30. The cooling unit 30 includes a hybrid vehicle (HV) device 31, which is an electric device installed in the vehicle, and a cooling passage 32, which is a pipe through which the refrigerant flows. The HV device 31 serves as an example of the heat generation source. One end portion of the cooling passage 32 is connected to the refrigerant passage 24a. Another end portion of the cooling passage 32 is connected to the refrigerant passage 24b.

The HV device 31 includes an electric device that generates heat during power transfer. The electric device includes, for example, at least one of an inverter that converts direct current power into alternating current power, a motor/generator serving as a rotating electric machine, a battery serving as a storage device, a converter that boosts a voltage of the battery, a direct current/direct current (DC/DC) converter that reduces the voltage of the battery, and so on. The battery is a secondary battery such as a lithium ion battery or a nickel hydrogen battery. A capacitor may be used instead of the battery.

The cooling apparatus 1 includes the passage forming portion 23a as a refrigerant path between the heat exchanger 14 and the heat exchanger 15 that does not pass through the cooling unit 30. The cooling apparatus 1 also includes the refrigerant passage 24 as another refrigerant path disposed in parallel with the passage forming portion 23a. The cooling unit 30 is provided in the refrigerant passage 24. The refrigerant path between the heat exchanger 14 and the heat exchanger 15 bifurcates such that a part of the refrigerant flows to the cooling unit 30.

The refrigerant flows through the refrigerant passage 24 via the cooling passage 32. While flowing through the cooling passage 32, the refrigerant cools the HV device 31 by drawing heat from the HV device 31. The cooling unit 30 is structured such that heat exchange can be performed between the HV device 31 and the refrigerant in the cooling passage 32. In this embodiment, the cooling unit 30 includes the cooling passage 32 formed such that an outer peripheral surface thereof directly contacts a casing of the HV device 31, for example. The cooling passage 32 includes a part that is adjacent to the casing of the HV device 31. In this part, heat exchange can be performed between the refrigerant flowing through the cooling passage 32 and the HV device 31.

The HV device 31 is cooled by being directly connected to the outer peripheral surface of the cooling passage 32 that forms a part of the refrigerant path extending from the heat exchanger 14 to the expansion valve 16 of the vapor compression refrigeration cycle 10. Since the HV device 31 is disposed on an exterior of the cooling passage 32, the HV device 31 does not interfere with the refrigerant flow flowing through the interior of the cooling passage 32. Accordingly, pressure loss in the vapor compression refrigeration cycle 10 does not increase, and therefore the HV device 31 can be cooled without increasing a power of the compressor 12. Alternatively, the cooling unit 30 may include an arbitrary conventional heat pipe that is interposed between the HV device 31 and the cooling passage 32 in the same manner as the cooling unit 70 for cooling the charger 71.

The refrigerant passage 24, which serves as a refrigerant path that passes through the cooling unit 30, and the passage forming portion 23a, which serves as a path that does not pass through the cooling unit 30, are provided in parallel between the heat exchanger 14 and the heat exchanger 15. Therefore, only a part of the refrigerant flowing between the heat exchanger 14 and the heat exchanger 15 flows into the cooling unit 30. An amount of refrigerant required to cool the HV device 31 in the cooling unit 30 is caused to flow to the refrigerant passage 24 so that the HV device 31 is cooled appropriately. As a result, overcooling of the HV device 31 can be prevented. Since not all of the refrigerant flows to the cooling unit 30, pressure loss in the flow of refrigerant through the refrigerant passage 24 and the cooling passage 32 can be reduced, and as a result, the amount of power required to operate the compressor 12 in order to circulate the refrigerant can be reduced.

The cooling apparatus 1 also includes a flow control valve 51. The flow control valve 51 is disposed in the passage forming portion 23a. The pressure loss of the refrigerant flowing through the passage forming portion 23a is increased or reduced by varying a valve opening of the flow control valve 51, and as a result, the flow control valve 51 adjusts a flow rate of the refrigerant flowing through the passage forming portion 23a and a flow rate of the refrigerant flowing through the refrigerant passage 24 and the cooling passage 32 as desired.

For example, when the flow control valve 51 is fully closed such that the valve opening thereof is set at 0%, all of the refrigerant flowing between the heat exchanger 14 and the heat exchanger 15 flows into the refrigerant passage 24 and the cooling passage 32. When the valve opening of the flow control valve 51 is increased, the flow rate of the refrigerant flowing through the passage forming portion 23a, of the refrigerant flowing between the heat exchanger 14 and the heat exchanger 15, increases while the flow rate of the refrigerant flowing through the refrigerant passage 24 and the cooling passage 32 in order to cool the HV device 31 decreases. When the valve opening of the flow control valve 51 is reduced, the flow rate of the refrigerant flowing through the passage forming portion 23a, of the refrigerant flowing between the heat exchanger 14 and the heat exchanger 15, decreases while the flow rate of the refrigerant flowing through the refrigerant passage 24 and the cooling passage 32 in order to cool the HV device 31 increases.

When the valve opening of the flow control valve 51 is increased, the flow rate of the refrigerant that cools the HV device 31 decreases, leading to a reduction in the ability to cool the HV device 31. When the valve opening of the flow control valve 51 is reduced, the flow rate of the refrigerant that cools the HV device 31 increases, leading to an improvement in the ability to cool the HV device 31. The amount of refrigerant that flows to the cooling unit 30 can be adjusted to an optimum amount using the flow control valve 51, and therefore overcooling of the HV device 31 can be prevented reliably. Moreover, pressure loss in the flow of refrigerant through the refrigerant passage 24 and the cooling passage 32 and the power consumption of the compressor 12 required to circulate the refrigerant can be reliably reduced.

The heat exchanger 18 is disposed inside a duct 40 through which air flows. The heat exchanger 18 adjusts a temperature of air-conditioning air flowing through the duct 40 by performing heat exchange between the refrigerant and the air-conditioning air. The duct 40 includes a duct inlet 41, which is an inlet through which the air-conditioning air flows into the duct 40, and a duct outlet 42, which is an outlet through which the air-conditioning air flows out of the duct 40. A fan 43 is disposed inside the duct 40 in the vicinity of the duct inlet 41.

When the fan 43 is driven, air flows through the duct 40. When the fan 43 is operative, the air-conditioning air flows into the interior of the duct 40 through the duct inlet 41. The air flowing into the duct 40 may be outside air or air in the passenger compartment of the vehicle. An arrow 45 in FIGS. 1 and 3 indicates a flow of the air-conditioning air that flows through the heat exchanger 18 so as to exchange heat with the refrigerant of the vapor compression refrigeration cycle 10. In the heat exchanger 18 during a cooling operation, the air-conditioning air is cooled while the refrigerant receives heat transfer from the air-conditioning air so as to be heated. In the heat exchanger 18 during a heating operation, the air-conditioning air is heated while the refrigerant transfers heat to the air-conditioning air so as to be cooled. An arrow 46 indicates a flow of the air-conditioning air flowing out of the duct 40 through the duct outlet 42 after being subjected to temperature adjustment in the heat exchanger 18.

During the cooling operation, the refrigerant flows within the vapor compression refrigeration cycle 10 so as to pass sequentially through a point A, a point B, a point C, a point D, a point E, a point F, and a point G, as shown in FIG. 1. Thus, the refrigerant circulates between the compressor 12, the heat exchangers 14, 15, the expansion valve 16, and the heat exchanger 18. The refrigerant circulates within the vapor compression refrigeration cycle 10 through a refrigerant circulation passage formed by connecting the compressor 12, the heat exchanger 14, the expansion valve 16, and the heat exchanger 18 in sequence using the refrigerant passages 21 to 29.

Figure 2:
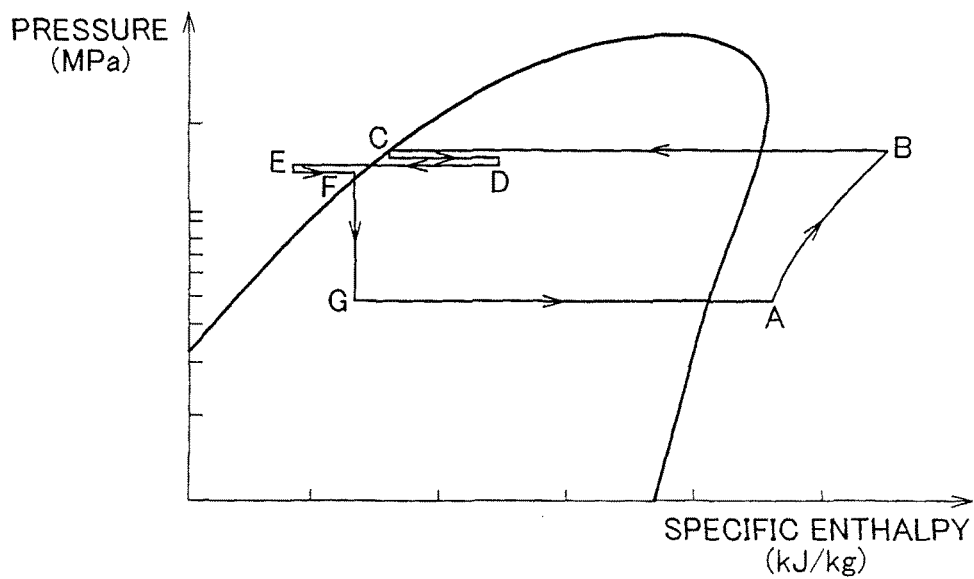
FIG. 2 is a Mollier chart showing states of the refrigerant during the cooling operation of a vapor compression refrigeration cycle shown in FIG. 1.

FIG. 2 is a Mollier chart showing states of the refrigerant during the cooling operation of the vapor compression refrigeration cycle 10. An abscissa in FIG. 2 shows a specific enthalpy (unit: kJ/kg) of the refrigerant, while an ordinate shows an absolute pressure (unit: MPa) of the refrigerant. A curve in the diagram represents a saturation vapor line and a saturation liquid line of the refrigerant. FIG. 2 shows a thermodynamic state of the refrigerant at each point (i.e. the points A, B, C, D E, F, and G) of the vapor compression refrigeration cycle 10, in which the refrigerant flows from the compressor 12 into the refrigerant passage 24a via the heat exchanger 14, cools the HV device 31, flows from refrigerant passage 24b into the refrigerant passage 25 via the heat exchanger 15, cools the charger 71, and then returns to the compressor 12 via the expansion valve 16 and the heat exchanger 18.

As shown in FIG. 2, the refrigerant (point A) that is aspirated into the compressor 12 in a superheated vapor state is adiabatically compressed in the compressor 12 along a geometric entropy line. As the refrigerant is compressed, the pressure and temperature thereof rise such that the refrigerant turns into high-temperature, high-pressure, highly superheated vapor (point B). The refrigerant then flows to the heat exchanger 14.

The high pressure refrigerant vapor that enters the heat exchanger 14 is cooled by exchanging heat with outside air in the heat exchanger 14. As a result, the refrigerant discharges sensible heat so as to change from superheated vapor into dry saturated vapor while remaining at a constant pressure. Latent heat of condensation is discharged such that the refrigerant gradually liquefies, thereby turning into wet vapor in a gas-liquid mixed state, and when the refrigerant is condensed entirely, a saturated liquid is formed (point C). The heat exchanger 14 forms a refrigerant liquid by isobarically discharging the heat of the superheated refrigerant gas compressed in the compressor 12 to an external medium. A gas phase refrigerant discharged from the compressor 12 is condensed (liquefied) by discharging the heat thereof to the periphery of the heat exchanger 14 such that the refrigerant is cooled. As a result of the heat exchange performed in the heat exchanger 14, the temperature of the refrigerant falls such that the refrigerant liquefies.

The saturated liquid state refrigerant that flows out of the heat exchanger 14 flows between the heat exchanger 14 and the cooling unit 30 through the refrigerant passage 24a so as to flow into the cooling unit 30. The refrigerant passage 24a is a passage through which the refrigerant flows from the heat exchanger 14 to the cooling unit 30. In the cooling unit 30, heat is discharged to the liquid refrigerant condensed while passing through the heat exchanger 14, whereby the HV device 31 is cooled. The refrigerant is heated by the heat exchange performed with the HV device 31, and as a result, the dryness of the refrigerant increases. When the refrigerant receives latent heat from the HV device 31 such that a part thereof vaporizes, the refrigerant turns into wet vapor intermixing saturated liquid and saturated vapor (point D).

The refrigerant then flows between the cooling unit 30 and the heat exchanger 15 through the refrigerant passage 24b so as to flow into the heat exchanger 15. The refrigerant passage 24b is a passage through which the refrigerant flows between the cooling unit 30 and the heat exchanger 15. The wet vapor of the refrigerant exchanges heat with the outside air in the heat exchanger 15 so as to be condensed again, and when the refrigerant is condensed entirely, it forms a saturated liquid. Further, the refrigerant discharges sensible heat so as to form a supercooled liquid (point E).

The high-pressure refrigerant supercooled by the heat exchanger 15 flows to the cooling unit 70 through the refrigerant passage 25 and cools the charger 71. As a result of the heat exchange performed with the charger 71, a degree of supercooling of the refrigerant decreases. In other words, the temperature of the refrigerant in the supercooled liquid state rises so as to approach a liquid refrigerant saturation temperature (point F). Next, the refrigerant flows into the expansion valve 16 through the refrigerant passage 26. In the expansion valve 16, the refrigerant in the supercooled liquid state is throttle-expanded such that the temperature and pressure of the refrigerant fall while the specific enthalpy thereof remains unchanged. As a result, the refrigerant turns into low-temperature, low-pressure wet vapor in a gas-liquid mixed state (point G).

The wet vapor state refrigerant discharged from the expansion valve 16 flows into the heat exchanger 18 through the refrigerant passage 25. The wet vapor state refrigerant flows into the tube of the heat exchanger 18. While flowing through the tube of the heat exchanger 18, the refrigerant absorbs heat from the air in the passenger compartment of the vehicle via the fin as latent heat of evaporation, and as a result, the refrigerant evaporates while remaining at a constant pressure. When the refrigerant turns entirely into dry saturated vapor, the temperature of the refrigerant vapor is raised further by sensible heat, and as a result, superheated vapor is formed (point A). In the heat exchanger 18, the refrigerant absorbs peripheral heat so as to be heated. The vaporized refrigerant is then aspirated into the compressor 12 via the refrigerant passage 28, the four-way valve 13 and the refrigerant passage 29. The compressor 12 compresses the refrigerant flowing from the heat exchanger 18. In accordance with this cycle, the refrigerant undergoes several changes of state, namely compression, condensation, throttle expansion, and evaporation, repeatedly and continuously.

Note that a theoretical refrigeration cycle was described in the above description of the vapor compression refrigeration cycle. Needless to mention, however, in the actual vapor compression refrigeration cycle 10, loss in the compressor 12 and pressure loss and heat loss in the refrigerant must be taken into account.

During the cooling operation, the heat exchanger 18 absorbs heat from peripheral air introduced so as to contact the heat exchanger 18 as the mist-form refrigerant flowing through the interior of the heat exchanger 18 vaporizes. The heat exchanger 18 uses the refrigerant reduced in pressure by the expansion valve 16 to cool the passenger compartment of the vehicle by absorbing vaporization heat generated when the wet vapor of the refrigerant evaporates into a refrigerant gas from the air-conditioning air that flows into the passenger compartment of the vehicle. The air-conditioning air reduced in temperature when the heat thereof is absorbed by the heat exchanger 18 flows into the passenger compartment of the vehicle, and as a result, the passenger compartment of the vehicle is cooled.

While the vapor compression refrigeration cycle 10 is operative, the refrigerant cools the passenger compartment by absorbing vaporization heat from the air-conditioning air in the heat exchanger 18. In addition, the high-pressure liquid refrigerant discharged from the heat exchanger 14 flows into the cooling unit 30 and cools the HV device 31 by exchanging heat with the HV device 31. Further, the high-pressure liquid refrigerant discharged from the heat exchanger 15 flows into the cooling unit 70 and cools the charger 71 by exchanging heat with the charger 71. Therefore, the cooling apparatus 1 cools the HV device 31 and the charger 71 serving as the heat generation source installed in the vehicle using the vapor compression refrigeration cycle 10 for air-conditioning the passenger compartment of the vehicle. Note that a temperature to which the HV device 31 is to be cooled is preferably at least lower than an upper limit value of a target temperature range serving as a temperature range of the HV device 31.

Figure 3:
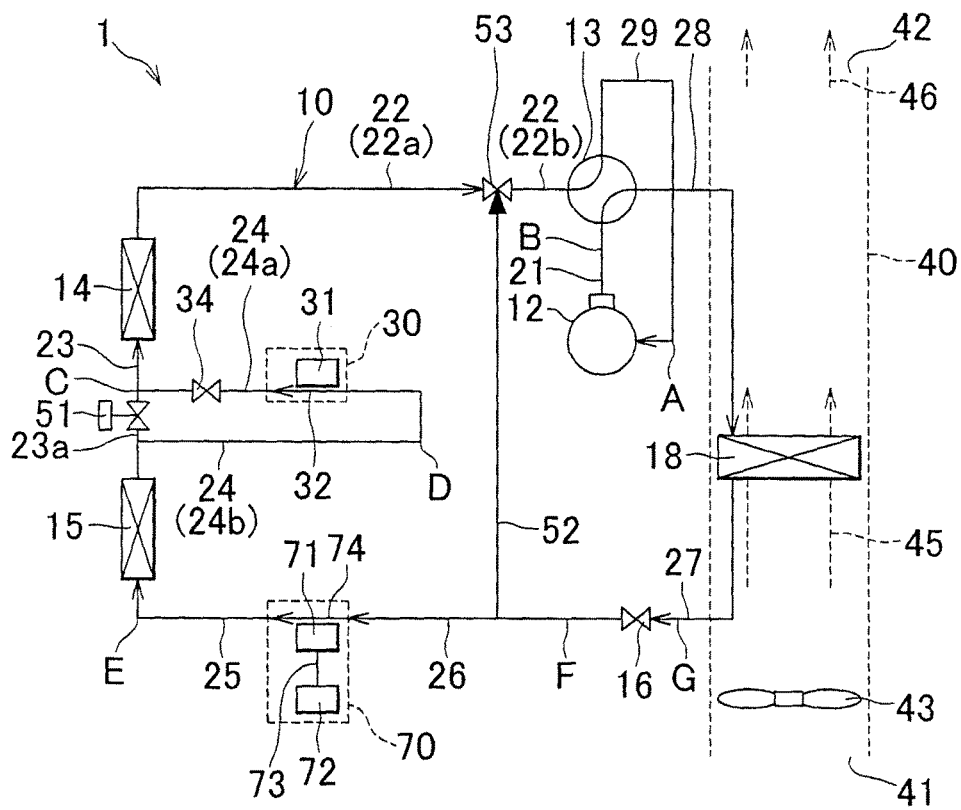
FIG. 3 is a schematic diagram showing the cooling apparatus in a condition where a four-way valve shown in FIG. 1 has been switched, and showing a flow of the refrigerant during a heating operation.

FIG. 3 is a schematic diagram showing the cooling apparatus 1 in a condition where the four-way valve 13 has been switched. Comparing FIGS. 1 and 3, the four-way valve 13 has been rotated 90°, thereby switching the path along which the refrigerant flowing into the four-way valve 13 from the outlet of the compressor 12 is discharged from the four-way valve 13. During the cooling operation shown in FIG. 1, the refrigerant compressed by the compressor 12 flows from the compressor 12 toward the heat exchanger 14. During the heating operation shown in FIG. 3, on the other hand, the refrigerant compressed by the compressor 12 flows from the compressor 12 toward the heat exchanger 18.

During the heating operation, the refrigerant flows within the vapor compression refrigeration cycle 10 so as to pass sequentially through a point A, a point B, a point G, a point F, a point E, a point D, and a point C, as shown in FIG. 3. Thus, the refrigerant circulates between the compressor 12, the heat exchanger 18, the expansion valve 16, and the heat exchanger 14, 15. The refrigerant circulates within the vapor compression refrigeration cycle 10 through a refrigerant circulation passage formed by connecting the compressor 12, the heat exchanger 18, the expansion valve 16, and the heat exchanger 14, 15 in sequence using the refrigerant passages 21 to 29.

Figure 4:
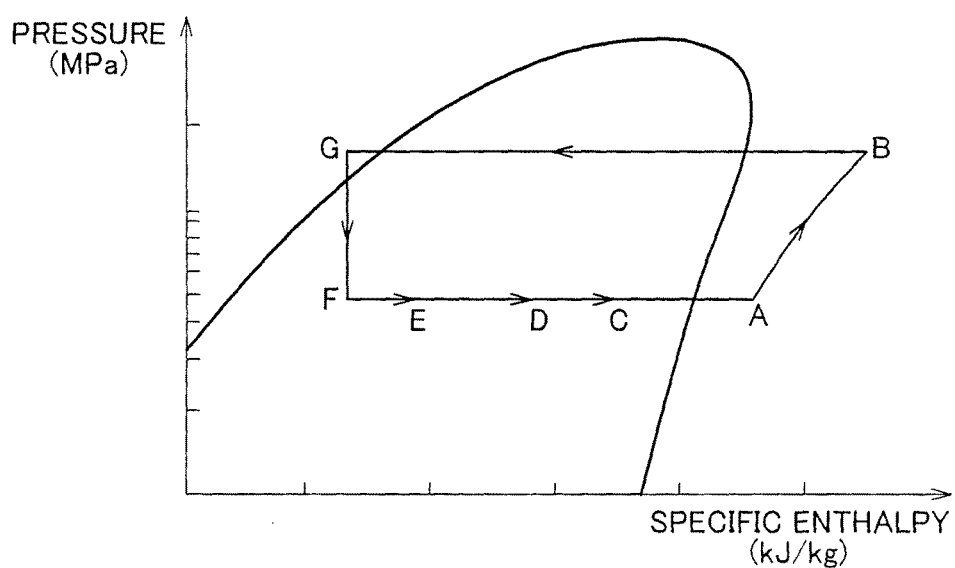
FIG. 4 is a Mollier chart showing states of the refrigerant during the heating operation of the vapor compression refrigeration cycle.

FIG. 4 is a Mollier chart showing states of the refrigerant during the heating operation of the vapor compression refrigeration cycle 10. An abscissa in FIG. 4 shows the specific enthalpy (unit: kJ/kg) of the refrigerant, while an ordinate shows the absolute pressure (unit: MPa) of the refrigerant. A curve in the diagram represents a saturation vapor line and a saturation liquid line of the refrigerant. FIG. 4 shows a thermodynamic state of the refrigerant at each point (i.e. the points A, B, G, F, E, D, and C) of the vapor compression refrigeration cycle 10, in which the refrigerant flows from the compressor 12 into the refrigerant passage 26 via the heat exchanger 18 and the expansion valve 16, cools the charger 71, flows from the refrigerant passage 25 into the refrigerant passage 24 via the heat exchanger 15, cools the HV device 31, and then returns to the compressor 12 from the refrigerant passage 23 via the heat exchanger 14.

As shown in FIG. 4, the refrigerant (point A) that is aspirated into the compressor 12 in a superheated vapor state is adiabatically compressed in the compressor 12 along a geometric entropy line. As the refrigerant is compressed, the pressure and temperature thereof rise such that the refrigerant turns into high-temperature, high-pressure, highly superheated vapor (point B). The refrigerant then flows to the heat exchanger 18.

The high-pressure refrigerant vapor that flows into the heat exchanger 18 is cooled in the heat exchanger 18 so as to change from superheated vapor into dry saturated vapor while remaining at a constant pressure. Latent heat of condensation is discharged such that the refrigerant gradually liquefies, thereby turning into wet vapor in a gas-liquid mixed state, and when the refrigerant is condensed entirely, a saturated liquid is formed. Further, sensible heat is discharged such that a supercooled liquid is formed (point G). The heat exchanger 18 forms a refrigerant liquid by isobarically discharging the heat of the superheated refrigerant gas compressed in the compressor 12 to an external medium. The gas phase refrigerant discharged from the compressor 12 is condensed (liquefied) by discharging the heat thereof to the periphery of the heat exchanger 18 such that the refrigerant is cooled. As a result of the heat exchange performed in the heat exchanger 18, the temperature of the refrigerant falls such that the refrigerant liquefies. Thus, the refrigerant is cooled by radiating the heat thereof to the periphery of the heat exchanger 18.

The high-pressure liquid phase refrigerant liquefied by heat exchanger 18 flows into the expansion valve 16 through the refrigerant passage 27. In the expansion valve 16, the supercooled liquid state refrigerant is throttle-expanded such that the temperature and pressure of the refrigerant fall while the specific enthalpy thereof remains unchanged, and as a result, low-temperature, low-pressure wet vapor in a gas-liquid mixed state is formed (point F). The refrigerant reduced in temperature by the expansion valve 16 flows into the cooling passage 74 of the cooling unit 70 through the refrigerant passage 26 and cools the charger 71. As a result of the heat exchange performed with the charger 71, the refrigerant is heated such that the dryness of the refrigerant increases. When the refrigerant receives latent heat from the charger 71, a part thereof vaporizes, leading to an increase in a proportion of saturated vapor in the wet vapor state refrigerant (point E).

The wet vapor state refrigerant discharged from the cooling unit 70 flows into the heat exchanger 15 through the refrigerant passage 25. The wet vapor state refrigerant flows into the tube of the heat exchanger 15. While flowing through the tube, the refrigerant absorbs heat from the outside air via the fin as latent heat of evaporation, and as a result, the refrigerant evaporates while remaining at a constant pressure. As a result of the heat exchange performed with the outside air in the heat exchanger 15, the refrigerant is heated such that the dryness of the refrigerant increases. When the refrigerant receives latent heat in the heat exchanger 15, a part thereof vaporizes, leading to an increase in the proportion of saturated vapor in the wet vapor state refrigerant (point D).

The wet vapor state refrigerant discharged from the heat exchanger 15 flows into the cooling passage 32 of the cooling unit 30 through the refrigerant passage 24b and cools the HV device 31. In the cooling unit 30, the HV device 31 is cooled when heat is discharged to the wet vapor state refrigerant intermixing saturated liquid and saturated vapor. As a result of the heat exchange performed with the HV device 31, the refrigerant is heated such that the dryness of the refrigerant increases. When the refrigerant receives latent heat from the HV device 31, a part thereof vaporizes, leading to an increase in the proportion of saturated vapor in the wet vapor state refrigerant (point C).

The wet vapor state refrigerant discharged from the cooling unit 30 flows into the heat exchanger 14 through the refrigerant passage 23. The wet vapor state refrigerant flows into the tube of the heat exchanger 14. While flowing through the tube, the refrigerant absorbs heat from the outside air via the fin as latent heat of evaporation, and as a result, the refrigerant evaporates while remaining at a constant pressure. When the refrigerant turns entirely into dry saturated vapor, the temperature of the refrigerant vapor is raised further by sensible heat, and as a result, the refrigerant vapor turns into superheated vapor (point A). The vaporized refrigerant is aspirated into the compressor 12 via the refrigerant passage 22, the four-way valve 13, and the refrigerant passage 29. The compressor 12 compresses the refrigerant flowing from the heat exchanger 14. In accordance with this cycle, the refrigerant undergoes several changes of state, namely compression, condensation, throttle expansion, and evaporation, repeatedly and continuously.

During the heating operation, the heat exchanger 18 adds heat to the peripheral air introduced so as to contact the heat exchanger 18 as the refrigerant vapor flowing through the interior thereof is condensed. The heat exchanger 18 uses the high-temperature, high-pressure refrigerant adiabatically compressed by the compressor 12 to heat the passenger compartment of the vehicle by discharging condensation heat generated when the refrigerant gas condenses into refrigerant wet vapor to the air-conditioning air that flows into the passenger compartment of the vehicle. The air-conditioning air increased in temperature after receiving heat from the heat exchanger 18 flows into the passenger compartment of the vehicle, and as a result, the passenger compartment of the vehicle is heated.

While the vapor compression refrigeration cycle 10 is operative, the refrigerant heats the passenger compartment of the vehicle by discharging condensation heat to the air in the passenger compartment in the heat exchanger 18. In addition, the low-temperature, low-pressure liquid refrigerant that passes through the expansion valve 16 flows into the cooling unit 70 and cools the charger 71 by exchanging heat with the charger 71. Furthermore, the refrigerant discharged from the heat exchanger 15 flows into the cooling unit 30 and cools the HV device 31 by exchanging heat with the HV device 31. Therefore, the cooling apparatus 1 cools the HV device 31 and the charger 71 serving as heat generation sources installed in the vehicle using the vapor compression refrigeration cycle 10 for air-conditioning the passenger compartment of the vehicle.

As described above, the cooling apparatus 1 according to this embodiment includes the four-way valve 13 that switches a direction in which the refrigerant flows through the vapor compression refrigeration cycle 10 during the cooling operation and the heating operation. During the cooling operation, the passenger compartment is cooled by causing the low-temperature, low-pressure refrigerant throttle-expanded by the expansion valve 16 to absorb heat from the air-conditioning air in the heat exchanger 18. During the heating operation, the passenger compartment is heated by causing the high-temperature, high-pressure refrigerant adiabatically compressed by the compressor 12 to discharge heat to the air-conditioning air in the heat exchanger 18. The cooling apparatus 1 can therefore adjust the temperature of the air-conditioning air flowing into the passenger compartment of the vehicle appropriately using the single heat exchanger 18 during both the cooling operation and the heating operation. Accordingly, there is no need to provide two heat exchangers to exchange heat with the air-conditioning air, and as a result, reductions in both the cost and the size of the cooling apparatus 1 can be achieved.

Further, the refrigerant flows into the cooling unit 70 in order to cool the charger 71 by exchanging heat with the charger 71, and flows into the cooling unit 30 in order to cool the HV device 31 by exchanging heat with the HV device 31. The cooling apparatus 1 therefore cools the HV device 31 and the charger 71 serving as the heat generation source installed in the vehicle using the vapor compression refrigeration cycle 10 that air-conditions the passenger compartment of the vehicle. Hence, the HV device 31 and the charger 71 are cooled using the vapor compression refrigeration cycle 10 provided in order to cool and heat the passenger compartment of the vehicle by performing heat exchange with the air-conditioning air in the heat exchanger 18.

There is no need to provide a dedicated device such as a water circulating pump or a cooling fan in order to cool the HV device 31 and the charger 71. Therefore, a number of configurations required by the cooling apparatus 1 to cool the HV device 31 and the charger 71 can be reduced, enabling simplification of the configuration of the cooling apparatus 1, and as a result, a manufacturing cost of the cooling apparatus 1 can be reduced. Furthermore, there is no need to operate a power source of a pump, a cooling fan, or the like for cooling the HV device 31 and the charger 71, and therefore no power need be consumed to operate such a power source. As a result, a reduction can be achieved in the amount of power consumed to cool the HV device 31 and the charger 71.

The HV device 31 is cooled by being directly connected to the outer peripheral surface of the cooling passage 32 that forms a part of the path of the refrigerant flowing between the heat exchanger 14 and the heat exchanger 15. The charger 71 is cooled by being directly connected to the outer peripheral surface of the cooling passage 74 that forms a part of the path of the refrigerant flowing between the heat exchanger 15 and the expansion valve 16. Since the HV device 31 and the charger 71 are disposed on the exterior of the cooling passage 32, the HV device 31 and the charger 71 do not interfere with the flow of refrigerant flowing through the interior of the cooling passage 32. Accordingly, pressure loss in the vapor compression refrigeration cycle 10 does not increase, and therefore the HV device 31 and the charger 71 can be cooled without increasing the power of the compressor 12.

When the low-temperature, low-pressure refrigerant that has already passed through the expansion valve 16 is used during the cooling operation to cool the HV device 31 and the charger 71, an ability of the heat exchanger 18 to cool the air-conditioning air deteriorates, leading to a reduction in a passenger compartment cooling ability. With the cooling apparatus 1 according to this embodiment, on the other hand, the high-pressure refrigerant that has not yet passed through the expansion valve 16 is used to cool the HV device 31 and the charger 71. The refrigerant is cooled to a sufficient supercooled state in the heat exchanger 15 after cooling the HV device 31, and maintained in the supercooled state even after cooling the charger 71. Therefore, the HV device 31 and the charger 71 can be cooled without affecting the ability to cool the air in the passenger compartment.

In the vapor compression refrigeration cycle 10, the high-pressure refrigerant discharged from the compressor 12 is condensed by both the heat exchanger 14 and the heat exchanger 15. When the refrigerant is cooled sufficiently in the heat exchanger 15, the refrigerant has a temperature and a pressure originally required to cool the passenger compartment of the vehicle at the outlet of the expansion valve 16. Accordingly, the amount of heat received by the refrigerant from the outside while evaporating in the heat exchanger 18 can be made sufficiently large.

The refrigerant is cooled in the heat exchanger 15 until it turns into a supercooled liquid, whereupon the supercooled liquid refrigerant is heated to a temperature slightly below a saturation temperature by sensible heat from the charger 71. The refrigerant then passes through the expansion valve 16, thereby turning into low-temperature, low-pressure wet vapor. At the outlet of the expansion valve 16, the refrigerant has a temperature and a pressure required originally to cool the passenger compartment of the vehicle. A radiation capacity of the heat exchanger 14 is determined such that the refrigerant can be cooled sufficiently.

Specifications of the heat exchanger 15 (more specifically, a size or a heat exchange performance of the heat exchanger 15) are determined such that the temperature of the liquid phase refrigerant after passing through the heat exchanger 15 is lower than a temperature required to cool the passenger compartment. The specifications of the heat exchanger 15 are determined such that the heat exchanger 14 has a radiation capacity which is greater than that of a heat exchanger of a vapor compression refrigeration cycle used in a case where the charger 71 is not cooled by an amount of heat assumed to be received by the refrigerant from the charger 71.

By determining the radiation capacity of the heat exchanger 15 so that the refrigerant can be cooled sufficiently in this manner, the charger 71 can be cooled without affecting the ability to cool the air in the passenger compartment. As a result, both the ability to cool the charger 71 and the ability to cool the passenger compartment can be secured reliably.

In the vapor compression refrigeration cycle 10 according to this embodiment, the heat exchangers 14, 15 are disposed in two stages between the compressor 12 and the expansion valve 16, and the cooling unit 30 serving as a cooling system for the HV device 31 is provided between the heat exchanger 14 and the heat exchanger 15. As shown in FIG. 2, the refrigerant need only be cooled to a saturated liquid state in the heat exchanger 14 during the cooling operation. The wet vapor state refrigerant that is partially vaporized after receiving latent heat of evaporation from the HV device 31 is then cooled again in the heat exchanger 15. The state of the refrigerant is changed at a constant temperature until the wet vapor state refrigerant has been completely condensed into a saturated liquid. Furthermore, the heat exchanger 15 cools the refrigerant to a degree of supercooling required to cool both the charger 71 and the passenger compartment of the vehicle.

In the case of a configuration in which the vapor compression refrigeration cycle 10 is provided with, as a heat exchanger, only the heat exchanger 14 between the compressor 12 and the expansion valve 16, then during the cooling operation, an amount of heat exchange corresponding to cooling of the passenger compartment and cooling of the HV device 31 and the charger 71 must be performed by the heat exchanger 14. Accordingly, the refrigerant must be cooled further from the saturated liquid state in the heat exchanger 14 until the refrigerant exhibits a predetermined degree of supercooling. When the refrigerant in the supercooled liquid state is cooled, the temperature of the refrigerant approaches an atmospheric temperature, leading to a reduction in a cooling efficiency of the refrigerant, and therefore a capacity of the heat exchanger 14 must be increased. As a result, a size of the heat exchanger 14 increases, which is disadvantageous for the vehicle-installed cooling apparatus 1. When the size of the heat exchanger 14 is reduced to facilitate vehicle installation, on the other hand, the radiation capacity of the heat exchanger 14 deteriorates. As a result, it may be impossible to reduce the temperature of the refrigerant at the outlet of the expansion valve 16 sufficiently, leading to a deficiency in the ability to cool the passenger compartment.

By disposing the heat exchangers 14, 15 in two stages between the compressor 12 and the expansion valve 16, there is no need to increase the degree of supercooling of the refrigerant, and the capacity of the heat exchangers 14, 15 can be reduced accordingly. Hence, the size of the heat exchangers 14, 15 can be reduced, and as a result, the cooling apparatus 1 obtained herein is small enough to be suitable for installation in a vehicle.

When the refrigerant flowing into the cooling unit 30 from the heat exchanger 14 cools the HV device 31, the refrigerant is heated by heat from the HV device 31. When the heated refrigerant vaporizes in the cooling unit 30, an amount of heat exchange between the refrigerant and the HV device 31 decreases so that the HV device 31 can no longer be cooled efficiently and pressure loss occurring in the refrigerant while flowing through a pipe increases. Therefore, the refrigerant is preferably cooled sufficiently in the heat exchanger 14 to ensure that the refrigerant does not vaporize after cooling the HV device 31.

More specifically, the state of the refrigerant at the outlet of the heat exchanger 14 is caused to approach a saturated liquid such that typically, the state of the refrigerant exists on the saturation liquid line at the outlet of the heat exchanger 14. When the heat exchanger 14 is provided with the ability to cool the refrigerant sufficiently in this manner, the radiation capacity of the heat exchanger 14 for discharging heat from the refrigerant improves beyond the radiation capacity of the heat exchanger 15. By cooling the refrigerant sufficiently in the heat exchanger 14 having a relatively large radiation capacity, the refrigerant can be kept in the wet vapor state after receiving heat from the HV device 31, thereby avoiding a reduction in the amount of heat exchange between the refrigerant and the HV device 31, and as a result, the HV device 31 can be cooled efficiently and sufficiently. After cooling the HV device 31, the wet vapor state refrigerant is efficiently cooled again in the heat exchanger 15 to a supercooled liquid state. Hence, with the cooling apparatus 1 provided herein, both the ability to cool the passenger compartment and the ability to cool the HV device 31 can be secured.

During the heating operation, the refrigerant is heated by heat absorbed from the charger 71 in the cooling unit 70, heated further by heat absorbed from the outside air in the heat exchanger 15, heated even further by heat absorbed from the HV device 31 in the cooling unit 30, and heated yet further by heat absorbed from the outside air in the heat exchanger 14. By heating the refrigerant in all of the cooling unit 70, the heat exchanger 15, the cooling unit 30, and the heat exchanger 14, the refrigerant can be heated to a sufficient superheated vapor state at the outlet of the heat exchanger 14, and therefore the HV device 31 and the charger 71 can be cooled appropriately while maintaining a superior heating performance with respect to the passenger compartment of the vehicle. Since the refrigerant is heated by the cooling units 30, 70 and waste heat from the HV device 31 and the charger 71 is used effectively to heat the passenger compartment, a coefficient of performance can be improved, and the amount of power consumed to compress the refrigerant adiabatically in the compressor 12 during the heating operation can be reduced.

As shown in FIG. 4, during the heating operation, the low-temperature refrigerant throttle-expanded by the expansion valve 16 flows through the heat exchangers 14, 15. Therefore, when an outside air temperature is low, frost may form on the heat exchangers 14, 15. The frost formed on the heat exchangers 14, 15 can be removed by performing a cooling operation such that high-temperature refrigerant flows to the heat exchangers 14, 15. In this case, however, the compressor 12 must be activated even though a heating effect is not obtained, and as a result, an increase in power consumption occurs.

Hence, the cooling apparatus 1 according to this embodiment includes the refrigerant passage 22 serving as a first passage through which the refrigerant flows between the compressor 12 and the heat exchanger 14, the refrigerant passage 26 serving as a second passage through which the refrigerant flows between the cooling unit 70 and the expansion valve 16, and a connecting passage 52 that connects the refrigerant passages 22, 26. The refrigerant can flow from the refrigerant passage 22 directly into the refrigerant passage 26 and from the refrigerant passage 26 directly into the refrigerant passage 22 via the connecting passage 52.

A three-way valve 53 serving as a switch valve for switching the refrigerant flow is disposed at a bifurcation point between the connecting passage 52 and the refrigerant passage 22. By disposing the three-way valve 53, the refrigerant passage 22 is divided into a refrigerant passage 22a on the heat exchanger 14 side of the three-way valve 53 and a refrigerant passage 22b on the four-way valve 13 side of the three-way valve 53. The three-way valve 53 switches a communication condition between the refrigerant passage 22 and the connecting passage 52. An open/closed condition of the three-way valve 53 is set such that either the refrigerant passage 22a and the refrigerant passage 22b communicate with each other or the refrigerant passage 22a and the connecting passage 52 communicate with each other.

Figure 5:
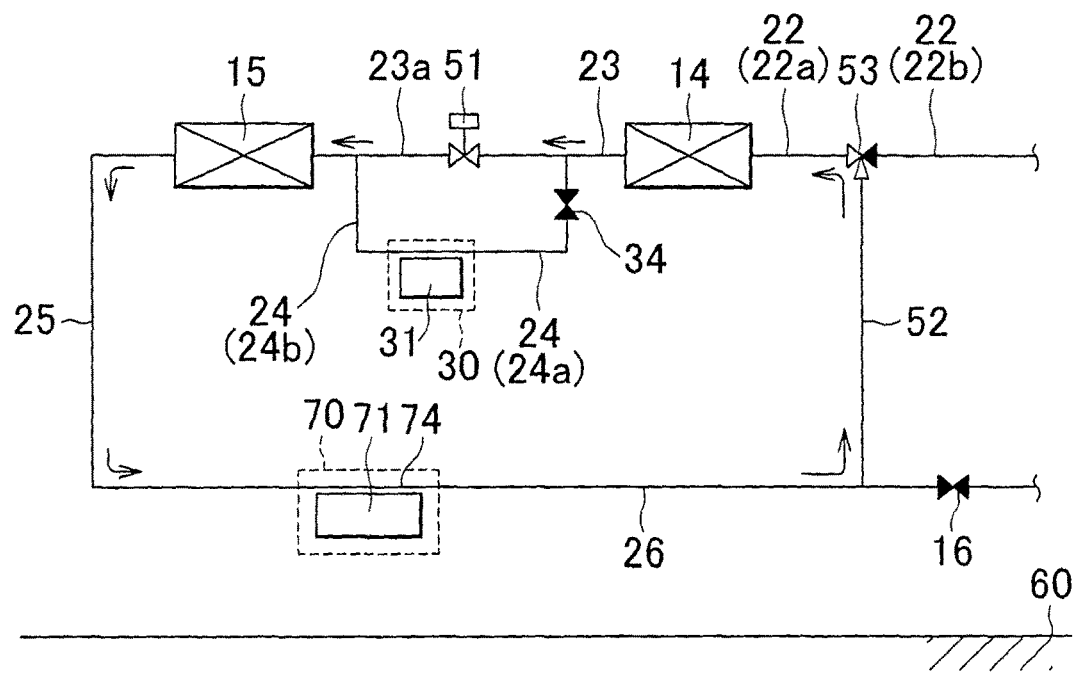
FIG. 5 is a schematic diagram showing a flow of the refrigerant for cooling a charger when the vapor compression refrigeration cycle is stopped.

FIG. 5 is a schematic diagram showing a flow of the refrigerant that cools the charger 71 when the vapor compression refrigeration cycle 10 is stopped. When a defrosting operation has to be performed on the heat exchangers 14, 15 during the heating operation shown in FIG. 3, the open/closed condition of the three-way valve 53 is switched by operating the three-way valve 53 such that the refrigerant flows from the connecting passage 52 into the refrigerant passage 22a. Further, the expansion valve 16 is fully closed. There is no need at this time to circulate the refrigerant through the entire vapor compression refrigeration cycle 10, and therefore the compressor 12 is stopped. By operating the three-way valve 53 such that the refrigerant flows from the connecting passage 52 into the refrigerant passage 22a and causing the refrigerant to pass through the connecting passage 52, a closed ring-shaped path on which the refrigerant flows from the cooling unit 70 to the heat exchanger 14 through the refrigerant passage 26, the connecting passage 52, and the refrigerant passage 22a, in that order, flows into the heat exchanger 15 through the refrigerant passage 23, and then returns to the cooling unit 70 through the refrigerant passage 25, as shown in FIG. 5, is formed.

The refrigerant can be circulated between the heat exchangers 14, 15 and the cooling unit 70 on the closed loop-shaped refrigerant path formed as described above without operating the compressor 12. When the refrigerant cools the charger 71 in the cooling unit 70, the refrigerant receives latent heat of evaporation from the charger 71 so as to evaporate. The refrigerant vapor vaporized in the cooling unit 70 flows to the heat exchangers 14, 15 successively through the refrigerant passage 26, the connecting passage 52, and the refrigerant passage 22a, in that order. In the heat exchangers 14, 15, the refrigerant vapor is cooled and condensed by a traveling breeze from the vehicle or a draft from a radiator fan. The refrigerant liquid liquefied in the heat exchangers 14, 15 then returns to the cooling unit 70 through the refrigerant passage 25.

Hence, a heat pipe in which the cooling unit 70 serves as a heating portion and the heat exchangers 14, 15 serve as a cooling portion is formed by the ring-shaped path passing through the cooling unit 70 and the heat exchangers 14, 15. Therefore, the charger 71 can be cooled reliably without activating the compressor 12 when the vapor compression refrigeration cycle 10 is stopped, or in other words when vehicle cooling/heating is stopped. Since the compressor 12 does not have to be operative at all times in order to cool the charger 71, the power consumption of the compressor 12 can be reduced, leading to an improvement in a fuel efficiency of the vehicle. Moreover, a lifespan of the compressor 12 can be extended, leading to an improvement in a reliability of the compressor 12.

FIG. 5 shows a ground surface 60. The cooling unit 70 is disposed below the heat exchangers 14, 15 in a vertical direction perpendicular to the ground surface 60. On the ring-shaped path for circulating the refrigerant between the heat exchangers 14, 15 and the cooling unit 70, the cooling unit 70 is disposed on a lower side and the heat exchangers 14, 15 are disposed on an upper side. Hence, the heat exchangers 14, 15 are disposed in a higher position than the cooling unit 70.

In this case, the refrigerant vapor that is heated and vaporized by the cooling unit 70 reaches the heat exchangers 14, 15 by traveling upward along the ring-shaped path. The refrigerant vapor is cooled in the heat exchangers 14, 15 and thereby condensed into liquid refrigerant, whereupon the liquid refrigerant is caused to travel downward along the ring-shaped path by a gravitational action so as to return to the cooling unit 70. In other words, a thermosyphon-type heat pipe is formed by the cooling unit 70, the heat exchangers 14, 15, and the refrigerant path connecting these components. By forming a heat pipe, a heat transfer efficiency from the cooling unit 70 to the heat exchangers 14, 15 can be improved, and therefore the charger 71 can be cooled more efficiently without an increase in power even when the vapor compression refrigeration cycle 10 is stopped.

Further, by causing the refrigerant vapor to flow to the heat exchangers 14, 15 using the waste heat of the charger 71, the heat exchangers 14, 15 can be heated, and as a result, frost can be removed from the heat exchangers 14, 15. Since frost can be removed from the heat exchangers 14, 15 without performing a conventional defrosting operation (i.e. the cooling operation of the vapor compression refrigeration cycle 10), a situation in which the air-conditioning air is cooled during the defrosting operation, leading to a reduction in the temperature of the passenger compartment, can be avoided.

The defrosting operation can be performed on the heat exchangers 14, 15 through a simple configuration obtained simply by adding the connecting passage 52 and the three-way valve 53 to the vapor compression refrigeration cycle 10. The refrigerant circulates between the cooling unit 70 and the heat exchangers 14, 15 by being evaporated and condensed repeatedly in accordance with the principles of a heat pipe, and therefore no power is required to cause the refrigerant to flow. Hence, there is no need to operate the compressor to cause the refrigerant to flow, and as a result, frost can be removed effectively from the heat exchangers 14, 15 without incurring an increase in power consumption relating to an operation of the compressor.

FIG. 5 shows an example in which the refrigerant is introduced into the connecting passage 52 by varying the open/closed condition of the three-way valve 53 disposed at the bifurcation point between the refrigerant passage 22 and the connecting passage 52. However, the configuration for introducing the refrigerant into the connecting passage 52 and forming a closed loop-shaped refrigerant path is not limited to this example. For example, the three-way valve may be disposed at a bifurcation point between the refrigerant passage 26 and the connecting passage 52. Note, however, that in this case, a separate valve is required to block the flow of refrigerant from the refrigerant passage 22 to the compressor 12. With the configuration shown in FIG. 5, the refrigerant flow from the refrigerant passage 26 to the heat exchanger 18 can be blocked by setting the expansion valve 16 of the vapor compression refrigeration cycle 10 in a closed condition. In other words, it is preferable to be able to form the closed loop-shaped refrigerant path reliably without the need to add an additional valve to the refrigerant passage 26.

The communication condition between the refrigerant passage 22 and the connecting passage 52 may be switched by disposing two open/close valves between the connecting passage 52 and the refrigerant passage 22b instead of the three-way valve 53, and setting one of the two open/close valves in an open condition and the other in a closed condition. The open/close valves used in this case may be formed with any simple structure enabling opening and closing of the refrigerant path, and therefore inexpensive valves may be used such that the cooling apparatus 1 can be provided at lower cost. On the other hand, a space required to dispose the three-way valve 53 may be smaller than that required for two open/close valves, and therefore, using the three-way valve 53, the cooling apparatus 1 provided herein can be reduced in size, enabling easier installation in the vehicle.

Further, an open/close valve 34 is provided as a refrigerant shutoff valve in the refrigerant passage 24 (24*a*) through which the refrigerant flows to the cooling unit 30. During the cooling and heating operations shown in FIGS. 1 and 3, the refrigerant must be caused to flow to the cooling unit 30 in order to cool the HV device 31, and therefore the open/close valve 34 is set in an open condition. On the other hand, when charging is performed on the storage battery 72 using the charger 71 while the vehicle is stationary and no-one is in the vehicle, the cooling and heating operations are not required. In this case, the HV device 31 does not have to be cooled, and therefore, as shown in FIG. 5, the refrigerant flow to the refrigerant passage 24 can be blocked by setting the open/close valve 34 in a closed condition.

As a result, the refrigerant can be prevented from flowing to the refrigerant passage 24 through which the refrigerant flows to the cooling unit 30. Since the entire amount of the refrigerant flows through the refrigerant passage 23 from the heat exchanger 14 to the heat exchanger 15, pressure loss in the refrigerant flow through the refrigerant passage 24 and the cooling passage 32 can be reduced reliably, enabling a further improvement in the efficiency with which the charger 71 is cooled while the vapor compression refrigeration cycle 10 is stopped.

Embodiments of the invention were described above, but the configurations of the respective embodiments may be combined appropriately. Further, the embodiments disclosed herein are examples with respect to all points, and are not therefore to be considered limiting. The scope of the invention is defined by the scope of the claims rather than the above description, and is intended to include equivalent definitions to the scope of the claims and all modifications within that scope.

The cooling apparatus according to the invention may be applied particularly advantageously to cool a charger using a vapor compression refrigeration cycle for cooling a passenger compartment of a vehicle such as a plugin hybrid vehicle or an electric automobile, which includes a charger that charges a chargeable/dischargeable storage battery upon reception of a supply of power from an external power supply.

The invention claimed is:

1. A cooling apparatus that cools a charger for charging a storage battery upon reception of a supply of power from a power supply, comprising:
   a compressor configured to compress a refrigerant in the cooling apparatus in order to circulate the refrigerant;
   a first heat exchanger configured to perform heat exchange between the refrigerant and outside air;
   a second heat exchanger configured to perform heat exchange between the refrigerant and the outside air;
   a pressure reducer configured to reduce a pressure of the refrigerant;
   a third heat exchanger configured to perform heat exchange between the refrigerant and air-conditioning air;
   a first cooling unit provided on a path along which the refrigerant flows between the second heat exchanger and the pressure reducer, the first cooling unit being configured to cool the charger using the refrigerant;
   a first passage through which the refrigerant flows between the compressor and the first heat exchanger;
   a second passage through which the refrigerant flows between the first cooling unit and the pressure reducer;
   a connecting passage configured to connect the first passage and the second passage; and
   a switch valve configured to switch a communication condition between the first passage and the connecting passage, the switch valve being disposed on the first passage, and the connecting passage extending from the first passage at the switch valve to the second passage, wherein the cooling apparatus is configured to circulate the refrigerant through the first heat exchanger, the second heat exchanger, and the first cooling unit via the connecting passage without operating the compressor.

2. The cooling apparatus according to claim 1, further comprising:
   a second cooling unit provided on a path along which the refrigerant flows between the first heat exchanger and the second heat exchanger, the second cooling unit being configured to cool a heat generation source using the refrigerant.

3. The cooling apparatus according to claim 2, further comprising:
   a third passage connected between the first heat exchanger and the second heat exchanger; and
   a fourth passage connected in parallel with the third passage between the first heat exchanger and the second heat exchanger,
   wherein the second cooling unit is provided in the fourth passage.

4. The cooling apparatus according to claim 3, further comprising:
   a refrigerant shutoff valve configured to shut off a flow of the refrigerant through the fourth passage.

5. The cooling apparatus according to claim 3, further comprising:
   a flow control valve configured to adjust a flow rate of the refrigerant flowing through the third passage.

6. The cooling apparatus according to claim 1, further comprising:
   a four-way valve configured to switch between a refrigerant flow from the compressor to the first heat exchanger and a refrigerant flow from the compressor to the third heat exchanger.

7. The cooling apparatus according to claim 6, wherein the switch valve is a three-way valve disposed midway on the first passage in order to switch respective communication conditions of the following three passages:
   a passage between the switch valve and the four-way valve in the first passage;
   a passage between the switch valve and the first heat exchanger in the first passage; and
   the connecting passage.

8. The cooling apparatus according to claim 1, wherein the first cooling unit is disposed below the first heat exchanger and the second heat exchanger in a vertical direction perpendicular to a ground surface.

* * * * *